(12) United States Patent
Harris

(10) Patent No.: US 8,081,158 B2
(45) Date of Patent: Dec. 20, 2011

(54) INTELLIGENT DISPLAY SCREEN WHICH INTERACTIVELY SELECTS CONTENT TO BE DISPLAYED BASED ON SURROUNDINGS

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 888 days.

(21) Appl. No.: 11/834,577

(22) Filed: Aug. 6, 2007

(65) Prior Publication Data

US 2009/0097712 A1   Apr. 16, 2009

(51) Int. Cl.
G09G 5/00   (2006.01)

(52) U.S. Cl. ....... 345/156; 345/158; 382/103; 705/14.4; 705/14.43; 705/14.49; 705/14.52

(58) Field of Classification Search .................. 345/156, 345/158; 382/103; 705/14.1–14.73
See application file for complete search history.

(56) References Cited

U.S. PATENT DOCUMENTS

| | | | |
|---|---|---|---|
| 6,256,046 B1 * | 7/2001 | Waters et al. .................. 345/473 |
| 6,869,013 B2 * | 3/2005 | Allen et al. .................... 235/381 |
| 6,873,710 B1 * | 3/2005 | Cohen-Solal et al. ........ 382/100 |
| 7,363,643 B2 * | 4/2008 | Drake et al. ..................... 725/34 |
| 7,636,456 B2 * | 12/2009 | Collins et al. ................. 382/118 |
| 2002/0078204 A1 * | 6/2002 | Newell et al. ................. 709/225 |
| 2003/0088832 A1 * | 5/2003 | Agostinelli et al. ........... 715/526 |
| 2003/0126013 A1 * | 7/2003 | Shand .............................. 705/14 |
| 2004/0037469 A1 * | 2/2004 | Werner et al. ................. 382/224 |
| 2006/0044559 A1 * | 3/2006 | Foy-Watson .................. 356/425 |
| 2006/0074769 A1 * | 4/2006 | Looney et al. .................. 705/26 |
| 2007/0027763 A1 * | 2/2007 | Yen et al. ......................... 705/14 |
| 2007/0100689 A1 * | 5/2007 | Axe et al. ........................ 705/14 |
| 2008/0004950 A1 * | 1/2008 | Huang et al. .................... 705/14 |
| 2008/0004953 A1 * | 1/2008 | Ma et al. ......................... 705/14 |
| 2008/0046320 A1 * | 2/2008 | Farkas et al. .................... 705/14 |
| 2008/0167913 A1 * | 7/2008 | Wiswell et al. ................... 705/7 |
| 2008/0262909 A1 * | 10/2008 | Li et al. ........................... 705/14 |
| 2008/0281661 A1 * | 11/2008 | Young et al. ...................... 705/8 |
| 2009/0083121 A1 * | 3/2009 | Angell et al. ................... 705/10 |
| 2010/0036717 A1 * | 2/2010 | Trest ............................ 705/14.1 |
| 2010/0274666 A1 * | 10/2010 | Wilf et al. .................. 705/14.48 |

* cited by examiner

*Primary Examiner* — Lun-Yi Lao
*Assistant Examiner* — Gregory J Tryder
(74) *Attorney, Agent, or Firm* — Law Office of Scott C. Harris, Inc.

(57) ABSTRACT

A display screen with a camera senses an image, detects characteristics of the image, and selects an item to be displayed based on the automatically detected characteristics.

14 Claims, 1 Drawing Sheet

INTELLIGENT DISPLAY SCREEN WHICH INTERACTIVELY SELECTS CONTENT TO BE DISPLAYED BASED ON SURROUNDINGS

BACKGROUND

Miniature cameras have become ubiquitous parts of many different items, including cellular telephones and laptops. Structure for making the cameras can be easily fabricated as part of any electronic device.

Image processing devices can be formed within the same circuitry that is used to carry out other functions such as displays.

SUMMARY

The present application describes a camera that is integrated with a display device. The camera obtains an image indicative of its surroundings, and determines characteristics of a person or thing that is located in the viewing area of the screen. An embodiment automatically changes the screen content based on those automatically detected characteristics.

DETAILED DESCRIPTION

Figure 1:
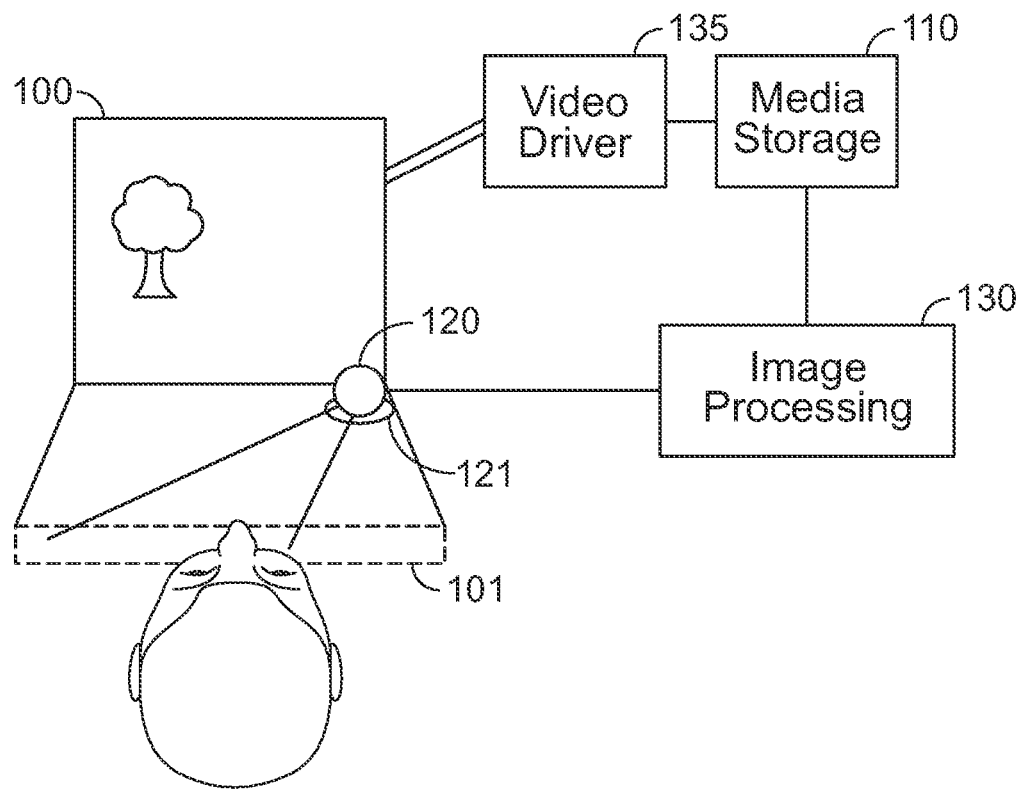
FIG. 1 shows an embodiment with a display screen.

An embodiment is shown in FIG. 1. A display screen 100 displays information which can be viewed within an area 101: the viewing area of the display screen. Any person in area 101 can view the contents of the display screen.

The display may be based on stored information, here shown as a media storage unit 110. The display screen 100 includes a camera portion 120 associated therewith, e.g., located at or near a corner of the screen, or in some area where it will not interfere with the display. The camera 120 may also be located off the screen for example. The camera may image the entire viewing area 101. A lens 121 may be used to adjust the incoming radiation. Alternatively, the image processor may determine electronically, the portion of the image that corresponds to the viewing area.

The output of the camera 120 is coupled to an image processor 130, which can be a processor that operates according to the characteristics described herein. Image processor 130 can be a general purpose processor that makes a selection from the media storage 110 to form an output for display, which is coupled through a video driver 135, to drive the display on the screen 100.

The media storage 110 may be any storage unit that stores a number of different media items. This can be a computer, a digital video recorder, a connection to a network based server, a media server, or any other item that stores media items. The media storage can hence be any item that stores media and can produce an output indicative of the stored media based on a selection.

The image processor 130 may process the image received from camera 120 to determine characteristics of a person or thing that is located in the viewing area of the screen. The specific image or media is selected for display based on the specific characteristics of the thing in the viewing area. This can use any known machine recognition technique, e.g., neural networks, to recognize the content within the scene sensed by the camera 120. It can also use a simpler technique of correlating with a kernel. In the kernel correlation embodiment, a "kernel" image is a small image of a searched-for feature, e.g., a generic face of 50 years old, or some part of that face. The part may be a skin texture, the way the eyes are set, or other age-indicating feature. The kernel is compared with each area in the image, and a distance between the kernel and the areas in the image are determined. The "distance" may be, for example, a least mean squared distance between the kernel and the image. The lowest distance between the image and each kernel is stored. The kernel with the lowest score is taken as best representing the item in the image, and is taken as the winner.

More sophisticated techniques can alternatively be used.

Figure 2:
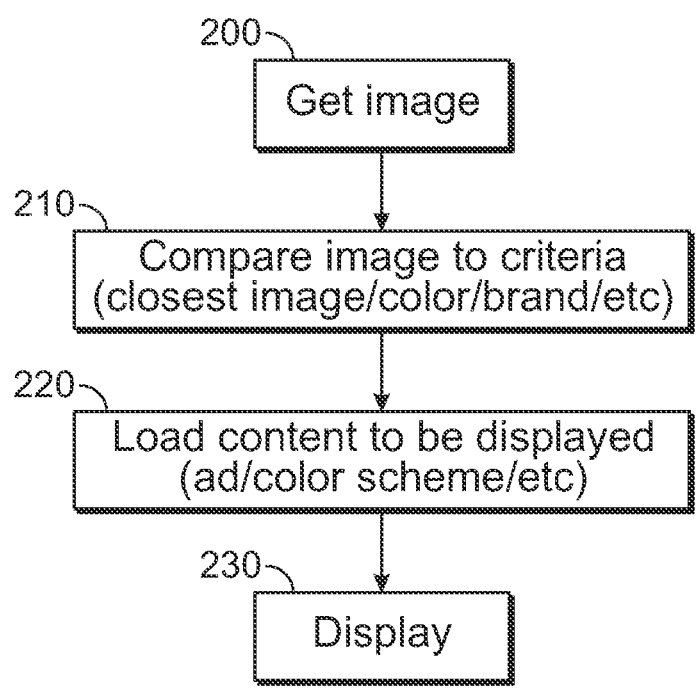
FIG. 2 shows a flowchart of operation.

Processor 130 may operate according to the flowchart of FIG. 2. At 200, an image is obtained. The pointing of the camera ensures that the image or video obtained by the camera represents the object in the viewing area of the screen.

A first embodiment, described herein, analyzes the image to look for a specific criteria, which may be part of any item within the image. Alternative embodiments may analyze multiple items—for example, it may analyze multiple items within the image, e.g., multiple faces. An embodiment establishes a hierarchy of criteria, and the first item that matches the highest ranked criteria wins. For example, "children's" may be ranked higher than "parents", because parents are often happy to watch items that are interesting to the children, while the reverse is not necessarily true. Also, a store that specializes in teen girls may display teen girls items whenever any teen girl is present, no matter what else is present. Another embodiment establishes group criteria, e.g., a boy and a girl together receive different content than either a boy, or a girl, individually.

At 210, the thus-obtained image is compared to a criteria. Different image criteria can be chosen depending on the applications. Many different applications are described herein, and each of these applications may use a different criteria. For example, when the display is displaying an advertisement, the criteria being used may be demographics of the person(s) who are watching the advertisement. In this case, the screen may be changed much more often, for example every minute. A simple example of a demographic bases the change in display on whether the person(s) viewing the screen is male or female or mixed (male and female), and selects a video or image from the media storage, tailored to a male or female. Another alternative is that the system can use automated techniques to determine a probable age range of the person(s) near the side. For example, techniques may be used to determine whether the watcher is a child, a teenager, someone who is middle-aged, or the like. Other criteria may sense colors associated with the person wearing, such as their hair color, clothing color, shoe color, automobile color, or other. The criteria may be stored in the media storing unit associated with the video or display information that is stored. For example, the criteria may be age, sex, color, or any other criteria discussed herein. A priority may be associated with the criteria, so that higher priority criteria take precedent over lower priority criteria.

In addition to estimating age, sex and color of clothing, the criterion may estimate the brand or style of clothes that they are wearing. Brand names on the clothes may be guessed based on characteristics like looking for labels, styles, colors or the like. At 220, according to a pre-stored set of rules, the content to be displayed is loaded from the media storage, and is displayed at 230. As an example, the detection of a teenage girl may play an advertisement for teen girl clothing, or a scene with teen girls or that appeals to teen girls. As another example, detection of a teen girl wearing red causes the red color scheme to be used, where at least one item of clothing shown on the screen is similarly red.

The displayed item is automatically selected from the media storage based on the automatic determination of characteristics of item(s) in the viewing area of the screen. However, it may be disconcerting if the image(s) or media changes too often. Accordingly, the obtaining 200 in FIG. 2 may be carried out at intervals that are appropriate for changing the viewing. For example, the viewing may be carried out every 1, 2, 3, 4 or 5 minutes, or every 15 minutes, every hour, or once a day.

The first played part of a many different items from the media storage may be cached locally, to reduce lag time. For example, the first 10 seconds of the 8 most commonly played videos may be cached locally, giving the media storage and any network connection 10 seconds to respond to any request.

Another embodiment may sense changes in the obtained image greater than a certain amount and automatically change the image when the image so changes. When the image changes only a little, or the content of the image moves around without a drastic change, the display might stay the same. However, when the image changes completely, a new analysis and display is made.

Different techniques can be used for different applications. For example, in an advertising technique, the media storage 110 may store eight different advertisements: e.g, for a young child male; young child female; teenager male, teenager female; parent age male; parent age females; 50+male, 50+female. Each of these different people may receive a different kind of display. The display may be advertising or may be an image or a video, e.g., one with embedded advertising or suggestive advertising. The advertising may all be for the same advertiser, or up to eight different advertisers (for this embodiment) may each share the same display to get their advertisements displayed to every person of the specified demographic, who comes near the screen.

This system can be used anywhere where any media of any type might be displayed; for example in an elevator, gas station, bathroom, taxi, or a billboard.

In the gas station environment, the sensing changes embodiment may use the camera to analyze the photo once every time a person comes up to the gas pump or when a car pulls up. The camera may also look for other information, such as the color of the car, the kinds of stickers on the car, the make of their car, and other information. Any of these things can be used to select the proper display content. For example, certain kinds of cars such as muscle cars may be highly correlated with people who are sports fans. Pulling up to a gas tank with a muscle car would indicate that it might make sense to provide a sports type advertising to the person at the gas pump. The video display on the gas pump may display an informational video or an advertisement, based on the kind of person who is pulling up.

In the bathroom or waiting room environment, a display might display a newspaper section tailored to the likely interests of the person close to the screen. This could be displayed on a wall, where it can be read by people in the room.

In any of the embodiments, a woman wearing Gucci clothes might receive a Gucci ad or other ad for designer clothing. A woman wearing pastel clothes might receive advertisements for more casual type clothing, or other clothes in pastel colors. A blonde haired woman might get advertisements for clothing that is styled or colored to look good with blonde hair.

In another embodiment, the system can be used in a cell phone, either to provide ads, to provide appropriate news, or for decoration. According to a decoration embodiment, the camera senses once per two hours, a color scheme of its surroundings, for example, what color the owner is wearing. Based on the color of the owner is wearing, the camera changes the color screen scheme on the display.

The above embodiment may use the demographics to display informative information instead of advertisements. For example, teenagers might be interested in different kinds of information then 50 plus or 70 plus people.

This can also be used for example in a waiting room, to decide what kinds of videos to play.

A television can also use the system, and in one embodiment, an autoplay television is described. The autoplay television automatically selects programs to play based on the audience, who is near the television. This can be used, for example, with a digital video recorder, such as a TIVO™. These devices often record "tivo picks", that is, programs that the system has automatically postulated as being appropriate for the kind of watching done by that tivo. In this embodiment, one of those programs may be selected for play, based on characteristics of the person near the television. In this embodiment, the video recorder is the media storage.

This can also be used in a computer, and can be used on a video wall. Any device that is playing images or videos can use this system.

The embodiment can use rules which relate image content to display content. For example, the rules may specify that if the image has a teenage girl therein, then video clip 1 should be selected, else_if the image has a teenage boy therein, video clip 2 is selected.

The above has described how the use of a camera can automatically select the content that is displayed on a display screen. This produces the advantage that the display screen becomes interactive and better matches the display to the likely interests of the watcher. This makes the displayed information more likely to be relevant to the watcher, something that could not be expected based on the prior art.

Another aspect operates to detect faces within the acquired image, and superimposes those faces on corresponding faces within the media served by the media storage unit 110.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other display systems can be used herein, and other criteria can be used to select items from the media storage to be displayed.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

The term "image" is used herein to represent a still image, e.g., a single image, or a single frame of a multiple frame video.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system comprising:
a display screen that is capable of displaying contents including an image or video, said display screen receiving an applied signal that includes information indicative of said contents, said display screen defining a viewing area from which said contents can be viewed;
a camera, associated with the display screen, and located to image said viewing area and to produce an output signal indicative of said imaging of said viewing area;
a media storing device that stores multiple items that can be displayed on said display screen, and where said multiple items can be selected for display on said display screen; and
an image processing part that processes image contents within said output signal from said camera, to determine automatically a color of objects within said output signal from said camera, and to select one of multiple color schemes for display based on said color of objects within said output signal from said camera, said select comprising selecting a first color scheme from said media storing device when a first color is determined by said image processing part, and selecting a second color scheme, different than said first color scheme, from said media storing device, when a second color, different than said first color, is determined by said image processing part.

2. A system as in claim 1, wherein said color determined by said image processing part is a color of clothes on a person within the image obtained in said viewing area.

3. A system as in claim 1, wherein said image processing part also detects a probable age of a person within the image obtained in said viewing area.

4. A system as in claim 1, wherein said image processing part also selects based on a sex of a person within the image obtained in said viewing area.

5. A system comprising:
a display screen that is capable of displaying contents including an image or video, said display screen receiving an applied signal that includes information indicative of said contents, said display screen defining a viewing area from which said contents can be viewed;
a camera, associated with the display screen, and located to image said viewing area and to produce an output signal indicative of said imaging of said viewing area;
a media storing device that stores multiple items that can be displayed on said display screen, and where said multiple items can be selected for display on said display screen; and
an image processing part that processes image contents within said output signal from said camera, to determine automatically whether said image contents match at least one criteria, and based on said matching said one criteria, to select one of said multiple items for display based on said criteria, said select comprising selecting a first item from said media storing device when a first criteria is determined by said image processing part, and selecting a second item, different than said first item, from said media storing device, when a second criteria, different than said first criteria, is determined by said image processing part, wherein said image processing part also detects information indicative of a brand name of items within the image and selects said item to be displayed based on the brand name that has been detected.

6. A system as in claim 5, wherein said image processing part detect said brand by identifying at least one of labels or styles on said items in the image.

7. A system as in claim 5, wherein said image processing part selects content which includes a same brand as the brand detected in the image.

8. A system as in claim 5, wherein said image processing part selects content which includes a similar brand as the brand detected in the image.

9. A method comprising:
displaying on an electronic display screen;
obtaining an electronic file indicative of image content in a viewing area, from which said electronic display screen can be viewed;
using a processor to analyze said electronic file to find multiple different criteria within said image content;
automatically ranking said criteria according to a hierarchy of criteria, to find a highest ranked criteria within said multiple criteria;
first based on said analyzing by said processor, finding a first aspect as one of said multiple different criteria within said image content, and responsive to finding said first aspect, selecting first display content and causing said first display content to be displayed on said display screen; and
second based on said analyzing by said processor, finding a second aspect within said image content as one of said multiple different criteria, and determining that said second aspect has a higher criteria based on said automatically ranking, and responsive to finding said second aspect and said determining that said second aspect has a higher criteria based on said automatically ranking, selecting second display content different than said first display content and terminating said display of said first display content and causing said second display content to be displayed on said display screen based on finding said second aspect.

10. A method as in claim 9, wherein one of said first aspect or said second aspect is an aspect related to an age of a person, and wherein said first and second analyzing comprises determining a first age person in an area of said display at a first time, and responsive to said determining, causing said first display content to be displayed, and second determining a second age person at a second time, and responsive to said second determining, terminating the first display and causing display of a second item.

11. A method as in claim 9, wherein one of said first aspect or said second is an aspect related to an sex of a person, and wherein said first and second analyzing comprises determining a first sex person in an area of said display at a first time, and responsive to said determining, causing said first display content to be displayed, and second determining a second sex person at a second time, and responsive to said second determining, terminating the first display and causing displaying of a second item.

12. A method as in claim 9, wherein said first and second selecting are carried out according to rules that define a priority between groups, with a boy and a girl together receive different content than either a boy, or a girl, individually.

13. A method as in claim 9, wherein one of said first aspect or said second aspect is an aspect related to an color within the image, and wherein said first and second analyzing comprises determining a first color in an area of said display at a first time, and responsive to said determining, causing said first display content which has a color scheme based on said first color to be displayed, and second determining a second color within the image at a second time, and responsive to said second determining, terminating the first display and causing second display content which has a color scheme based on said second color to be displayed.

14. A method as in claim 9, wherein one of said first aspect or said second aspect is an aspect related to an brand name of an item and wherein said first and second analyzing comprises determining a first brand in an area of said display at a first time, and responsive to said determining, causing said first display content to be displayed, and second determining a second brand name at a second time, and responsive to said second determining, terminating the first display and causing displaying of a second item.

* * * * *